3,265,102
VALVE MEANS FOR GAS LIGHTERS
Masajiro Yoshinaga, Taito-ku, Tokyo, Japan, assignor to Yoshinaga Prince Kabushiki Kaisha, Tokyo, Japan
Filed May 6, 1964, Ser. No. 365,287
Claims priority, application Japan, June 21, 1963, 38/45,060
5 Claims. (Cl. 141—295)

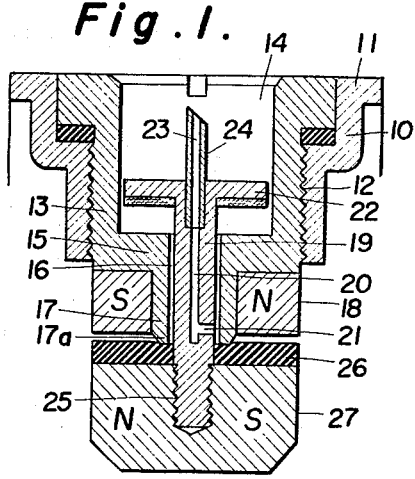
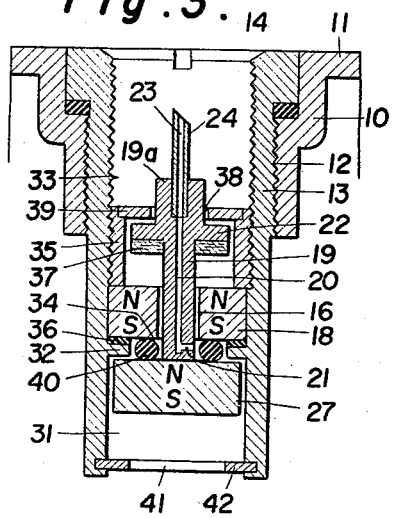
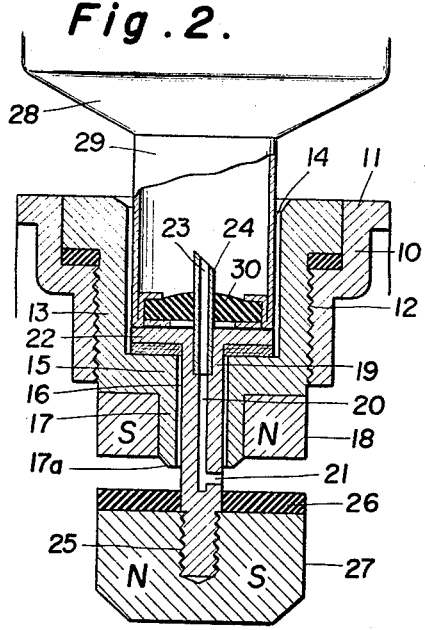
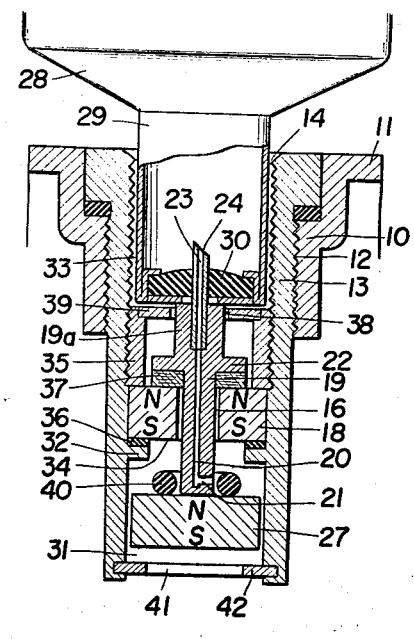

This invention relates to improvements in or relating to valve means for filling gas lighters with fuel consisting of liquified propane, butane or a mixture thereof.

Known filling devices for gas lighters comprise a stationary part adapted to fit in the bottom thereof, an annular valve seat formed therein, and an axially movable valve member adapted to introduce the fuel into the reservoir of the lighter. The movable valve assembly has inlet and outlet ports in communication with a central bore extending through the valve member, and an extension on one end of the valve member to receive a coil spring. The spring is seated at its other end in the stationary part so that the upward biasing force of the spring normally maintains the outlet port in closed position above the valve seat. When the valve assembly is moved axially downward by an external force, such as the insertion of a filling device, the outlet port is positioned below the valve seat to permit fuel injection through the inlet port, down the central bore, out of the outlet port and into the reservoir of the lighter. For this reason, most of the existing filling devices are built with a relatively long stationary part to accommodate the axial movement of the valve assembly and a relatively long coil spring in order to provide sufficient strength to repeatedly move the valve assembly to a closed position. This would necessarily reduce the capacity of fuel storage in the lighter and would not be compatible with small pocket lighters.

The disadvantage of the coil-spring filling devices is that the movable valve assembly is subject to undue tension, resulting in sluggish filling operation. This is because it is difficult to determine the effective pressure to be exerted upon the valve assembly to close the valve in a smaller filling device and hence to use a coil spring of optimum tension. Therefore, most of these devices are often inadvertenty provided with coil springs having a tension far greater than actually needed. On the other hand, should there be any suitable coil spring available, it would not solve the problem simply because the spring is bound to decrease in its tension after repeated use and cannot stand prolonged service.

Accordingly, it is the principal object of this invention to provide an improved device for filling a gas lighter with liquefied gas fuel which has incorporated therein two ferrite permanent magnets superseding the conventional coil spring and which will eliminate the above noted difficulties.

One of the two ferrite permanent magnets is secured in place at the stationary part while the other magnet is operatively associated with the movable valve assembly. To effect the valve action either the attracting force resulting from a heteropolar orientation (S←→N) of the two magnets or the repelling force resulting from a homopolar orientation (S←→S) (N←→N) may be utilized. The strength of magnetism required to close the valve is of the order of 8 grams with the two magnets placed 1 millimeter apart. It follows that the stroke of the moving part may be reduced considerably.

Another advantage resulting from the use of ferrite permanent magnets in place of the conventional coil spring is that the size of the stationary part of the valve may be minimized and the fuel reservoir capacity of the lighter may be accordingly amplified for a given size of the lighter.

A further advantage of the invention is that the valve is smoothly released by the magnetic action of the ferrite magnets when the fuel is introduced into the reservoir.

It may be further added that the two ferrite permanent magnets may be located with ease and without particular regard to the structural and positioning limitations of the stationary part and movable part of the valve construction.

These and other features of the invention may be more fully understood from the following description taken in conjunction with the accompanying drawings which should be considered only as illustrative of the principles of the invention and not in a limiting sense.

In the drawings:

FIG. 1 is a longitudinal cross-sectional view of a filling valve embodying the invention shown in closed position;

FIG. 2 is a similar view of the device of FIG. 1 illustrating the tip of the fuel container inserted in the opening of the valve which is shown in open position;

FIG. 3 is a longitudinal cross-sectional view of another valve device embodying the invention shown in closed position like that of FIG. 1;

Figure 5:
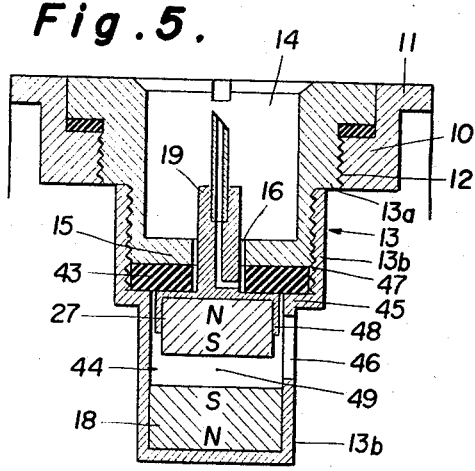
Figure 6:
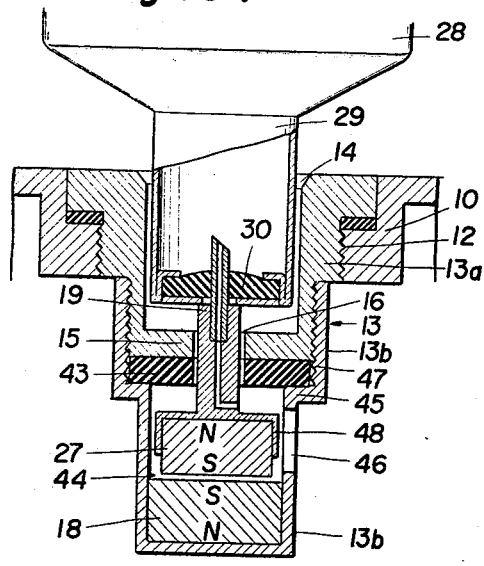

FIG. 4, similar to FIG. 2, illustrates the valve in open position;

FIG. 5 is a longitudinal cross-sectional view of a third embodiment of the invention and FIG. 6, similar to FIG. 2, illustrates the valve in open position.

Like reference numerals refer to like parts throughout the drawings.

FIG. 1 shows a wall member 10 which is secured to the bottom portion 11 of the lighter and which is in threaded engagement with a stationary part or member 13 having a threaded periphery 12. The stationary member 13 may be of a cylindrical form which is provided with an opening 14 and with a relatively large bore 16 at the center of the bottom place 15 which is cut away around the bore 16 to leave a land 17. The lower edge portion of the land 17 is adapted to serve as a valve seat 17a. There is provided a ring of ferrite permanent magnet 18 which is attached to the periphery of the land 17, leaving some marginal portion of the land 17 to serve as a valve seat. A movable valve member 19 of cylindrical configuration is provided internally with a liquefied gas passageway 20 extending lengthwise of the valve structure and running through the central bore 16 and further provided with a liquefied gas outlet 21 in communication with the bore 16. The movable member 19 is further provided at the upper end thereof with a guide flange 22 and with a needle member having a pore 23 communicating with the gas passageway 20. The guide flange 22 and needle tube 24 are located in the opening 14 of the stationary member 13.

The movable member 19 is threaded at 25 thereby securing a rubber valve member 26 to the upper face of a ferrite permanent magnet disc or receptacle 27. As this magnet disc is attracted toward the ferrite magnet ring 18 of the stationary part 13, the rubber valve member 26 comes into contact with the valve seat 17a formed integrally with the land 17, thereby closing up the gap 16a which has been created between the movable member 19, liquefied gas outlet 21 and bore 16.

The filling valve device is normally held in closed position with the movable member 19 forced upward by mutual attraction of the ferrite magnet ring 18 of the stationary part 13 and the ferrite magnet member 27 of the moving part 19. When supplying the reservoir of the lighter with fuel, the movable member 19 is depressed from above to cause the two ferrite magnet members to move apart so that the gas outlet 21 is exposed underneath the valve seat 17a.

FIG. 2 illustrates the filling device while being filled with fuel, in which the fuel container or bottle 28 is inserted with its tip end 29 into the opening 14 of the stationary member 13. The fuel bottle 28 just mentioned may be of the type which contains liquefied gas sealed within by a rubber tap 30 provided at the tip end 29 thereof. The force required to push the bottle 28 downwardly in this manner may be considerably reduced as compared with the conventional types of valve devices. This is because, substantially different from those using a coil spring, it will suffice to apply a slight pressure to the bottle 28, just enough to overcome the attraction of the two magnets and thereby retract the movable member 19 from closed position.

It will be readily understood that when the fuel bottle 28 is depressed, the movable member 19 is caused to retract against the attracting tendency of the two magnets until the gas outlet 21 comes to underlie the valve seat 17a and the upper guide flange 22 contacts the bottom plane 15 of the stationary part 13. Thus with the bottle 28 depressed and the movable member 19 held motionless, the fuel enters through the needle tube 24 as this breaks through the rubber tap 30 of the bottle 28. The fuel then flows through the small fuel channel or pore 23 communicating with the gas passageway 20 and into the reservoir of the lighter via outlet 21.

After the lighter is filled as desired, the fuel bottle 28 may be pulled out, at which time the movable member 19 returns to its normal upper position by the effect of magnetic attraction exerted between the ferrite magnet ring 18 of the stationary part 13 and the ferrite magnet member 27 of the movable part 19. At the same time, the rubber valve member 26 is forced into contact with the valve seat 17a thereby bringing the filling unit into closed position.

In the embodiment of the invention above described, it is to be noted that two magnets are used having the hetero-polar properties, e.g. N-pole against S-pole or S-pole against N-pole which produce an attracting tendency between the two magnets required to hold the valve in normally closed position, and the first magnet member being preferably of an annular form should be located above the second magnet member attached to the moving member of the valve.

The movable member 19 and ferrite permanent magnet 27 may be modified by other special methods. FIG. 3 shows one of the preferred modifications of the filling device according to the invention. Closing the valve in this example may be accomplished in a manner similar to the example of FIG. 1 already discussed. The stationary part 13 is a relatively long cylinder (however, the length of which is less than the conventional counterpart using a spring) which is provided internally at the lower portion with a flange 32 projecting inwardly. A sufficient space is maintained between the inner walls of the stationary part to permit a magnetic ferrite valve member 27 to move vertically therebetween. Ring member 35, within which member 27 is moved, is threaded to inner wall 33 at a position above flange 32. Flange 32 has mounted thereon the ferrite permanent magnet member 18 which serves concurrently as a valve seat 34 as later explained. The internal threaded wall 33 is adapted to engage a threaded ring fitting 35 thereby securing the magnet member 18 to the flange 32. The ferrite permanent magnet 18 is a disc having the polarity bisected for N-pole region and S-pole region, respectively, and having a bore 16 extending centrally in the longitudinal direction. The magnet 18 is mounted on the flange 32 with its N-pole region above the S-pole region, using a packing 36, and is secured thereto by threaded engagement of the threaded ring member 35 and threaded inner wall member 33. In this instance, the lower face of the S-pole region is adapted to serve as a valve seat 34.

The movable member 19 in the second embodiment of the invention is practically the same as that shown in FIG. 1, except it has a head member 19a on top of the guide flange 22 and a packing 37 which underlies the flange 22. The needle tube 24 having a pore 23 at the head 19a communicates with the longitudinally extending fuel passageway 20.

The movable member 19 is inserted through the opening 14 of the stationary part 13 and positioned within the central bore 16 extending through the ring magnet 18, leaving a peripheral gap 16a therebetween. To the threaded ring member 35 is soldered a stopper member 39 having a bore 38 of a diameter slightly greater than the head 19a in which to accommodate the guide flange 22. With this construction, the movable member 19 is able to move vertically as far as the guide flange 22 can move within the threaded ring member 35. At the same time, the movable member 19 is held in place within the stationary part 13 by means of the guide flange 22 and stopper member 39.

In the same manner as the ferrite magnet member 18, the magnet valve member 27 consists of two separate polar regions, N-pole above S-pole. The magnet member 27 is inserted in the space 31 through the bottom of the stationary part 13, with its N-pole region face up. A resilient O-ring member 40 is simultaneously inserted to come in between the flange 32 and the lower end of the movable member 19. The stationary part 13 is thereafter sealed at the bottom with a plate member 42 having a hole 41. The magnet valve member 27 is thus disposed to be movable within the space 31 of the stationary part 13.

The magnet valve member 27 is normally positioned in the upper portion of the space 31 and assumes a heteropolar relation with the magnet member 18 attached to the stationary part 13. The O-ring member 40 is held in pressure engagement with the lower face of the magnet member 18, i.e. the valve seat 34, while the lower end of the movable member 19 that is in contact with the upper face of the magnet member 27 is forced upwardly to hold the movable member 19 normally in upper position. As the liquefied gas outlet 21 leading to the fuel passageway 20 is exposed in the ring member 40, the filling valve device is held in substantially closed position by the O-ring member 40 interposed between the two magnet members 18 and 27.

The filling device illustrated in FIG. 3, which is characterized by the construction in which a movable member 19 is held in contact with the magnet valve member 27, may be operated in a manner similar to that shown in FIG. 2, wherein the fuel is introduced from the bottle 28 into the reservoir of the lighter by inserting the tip 29 into the opening 14 of the stationary part 13.

FIG. 4 shows the fueling operation being performed with the second embodiment of the invention above described. The magnet valve member 27, which has been attracted to the magnet member 18, is caused to separate therefrom by the lower end of the movable member 19 moving downwardly in response to the depressing force applied to the fuel bottle 28, and moves together with the O-ring member 40 downwardly through the space 31 of the flange 32. The downward movement of the movable member 19 terminates at the point where the guide flange 22 comes into direct contact with the magnet member 18, in which instance there must be reserved a sufficient gap 31a between the magnet member 27 and the seal plate 42 at least to allow the flow of the fuel therethrough. In this manner, the liquefied gas fuel from the bottle 28 enters the passageway 20 of the movable member 19 and passes through the outlet 21 into the space 31. The fuel further advances through the gap 31a created between the magnet member 27 and stationary part 13 and between the magnet member 27 and seal plate 42, and finally flows through the hole 41 into the reservoir of the lighter.

After the filling operation, it will be quite obvious that the valve is returned to closed position by the action of the permanent magnet valve member 27 following the removal of the bottle 28 from the needle tube 24.

The foregoing two embodiments of the invention both employ a pair of ferrite magnets and operate with the attracting force of the two magnets. It will readily occur to those skilled in the art that the magnetic polarity may be changed from the heteropolar homopolar orientation, thus: S S and N N, with equally good results. The valve may close, in this case, by the repelling force of the two magnets, as is illustrated in FIG. 5.

As illustrated, the stationary part 13 has an opening 14 at the upper portion thereof and has supported thereon an upper wall member 13a secured to the wall 10 of the bottom member 11 of the lighter and a valve seat 43 made of a rubber sheet. The stationary part 13 further comprises a lower wall member 13b which forms compartment 44 to accommodate two ferrite magnet members therein.

The rubber valve seat 43 is secured to the bottom face 15 of the upper portion 13a in the opening 14. The upper wall portion 13a is in threaded engagement with a cylindrical bottom member 13b at the threaded portion 47. The cylindrical bottom member 13b is provided with a fuel supply hole 46 at its peripheral wall below the supporting part 45 of the stationary member 13.

The movable part 19 is inserted through the bore 16 in the bottom 15 of the upper stationary member 13a until the lower end thereof is exposed within the compartment 44. The movable member 19 has a frame member 48 with a ferrite magnet 27 attached to its lower end. This magnet member has an N-pole region located above an S-pole region, both being integrally formed, and is arranged in opposition to the repelling magnet member 18, across a gap 49.

The magnet member 18, contrary to the magnet member 27, has the S-pole region located above the N-pole region so a repelling magnetic action will be produced between the two associated magnet members 18 and 27, thereby forcing the magnet member 27 into contact with the valve seat 43 to maintain the valve in normally closed position. In this instance, all parts constituting the stationary and movable members 13 and 19 should preferably be made of nonmagnetizable metallic materials.

The third embodiment of the invention thus constructed operates substantially on the same principles as illustrated in connection with FIGS. 2 and 4. Referring to FIG. 6, it will be appreciated that when the fuel from the bottle 28 is fed with the injecting tip 29 depressed against the needle tube 24 of the movable part 19, the upper magnet member 27 is forced toward the lower magnet valve member 18 which would otherwise be kept apart therefrom by the prevailing repelling action. The fuel enters the system of the valve as the needle tube 24 forces the rubber tap 30 open.

It will also be appreciated that the valve will close with the magnet member 27 forced against the valve seat 43 by the effect of repelling magnetic force working between the two opposite magnet members as soon as the fuel container 28 is removed.

While certain specific forms of the invention have been described in some detail together with the theories that best explain their functions, it is to be understood that the invention is not limited to the precise construction described nor is it dependent upon the accuracy of the theories which have been advanced. On the contrary, the invention is not to be regarded as limited except insofar as possible limitations are included within the terms of the claims in which it is the intention to claim all novelty inherent in the invention as broadly as is permissible in view of the prior art.

Having thus described the invention, what is claimed and desired to be secured by Letters Patent is:

1. A filler valve assembly for gas lighters comprising a stationary member adapted to be secured to the bottom of a lighter, said stationary member including a horizontal plate and vertical walls extending upwardly therefrom, said plate and walls defining a central cavity adapted to receive a fuel vessel therein, a valve seat integrally formed with said stationary member, a valve assembly including a valve body member with an inlet port at its upper end, a central bore, and an outlet port near its lower end, said valve body member being axially movable within said stationary part in response to downward pressure to move said outlet port below said valve seat, a first magnet secured to the lower portion of said stationary member, a second magnet secured to the lower end of said valve body, and said first and second magnets normally being mutually attracted towards each other to thereby move said outlet port above said valve seat and maintain the valve assembly in closed position.

2. The device as claimed in claim 1 wherein said first magnet member is located above said second magnet member, the two magnets being oriented in a heteropolar relation to produce a mutually attracting tendency thereby forcing said movable body member upward to keep the valve assembly normally closed.

3. The device as claimed in claim 1 wherein said stationary part is provided with a compartment at the lower end thereof to accommodate said first magnet member therein, and said second magnet member is located above said first magnet member, the two magnets being oriented in a homopolar relation to produce a mutually repelling tendency thereby maintaining the valve assembly in normally closed position.

4. The device as claimed in claim 1 which comprises a stationary member with an internally threaded cylinder, a downwardly projecting flange connected therewith leaving a space sufficient to permit the movement of said valve body member, a packing located above said flange, a magnet of cylindrical configuration, an axially extending aperture formed through said cylinder to allow movement of said movable member therethrough, a threaded ring member, said magnet being adapted concurrently to serve as a valve seat, said movable member being movably inserted within said stationary member and being exposed downwardly in said space underlying said flange, a second magnet positioned together with an O-ring in said space, said two magnets being arranged in opposition to produce a magnetic force thereby forcing said movable member and said O-ring to maintain the valve in normally closed position.

5. The device as claimed in claim 1 wherein said stationary member is provided with a bottom portion, said bottom portion having a relatively large bore adapted to communicate with the cavity in said stationary member, said second magnet on said valve body being movable within said bottom portion of said stationary member, and a rubber valve seat disposed between said horizontal plate and said upper end of said first magnet, said movable body being normally forced by the magnetic action of said magnets into a closed position with said outlet port disposed above said rubber valve seat.

References Cited by the Examiner

UNITED STATES PATENTS

| | | | |
|---|---|---|---|
| 2,609,669 | 9/1952 | Eddy | 251—65 X |
| 2,667,895 | 2/1954 | Pool et al. | 251—65 X |
| 3,221,782 | 12/1965 | Zellweger et al. | 141—295 X |

FOREIGN PATENTS

| | | |
|---|---|---|
| 715,600 | 9/1954 | Great Britain. |
| 951,177 | 3/1964 | Great Britain. |

LAVERNE D. GEIGER, *Primary Examiner.*

H. BELL, *Examiner.*